(12) United States Patent
Ai et al.

(10) Patent No.: US 11,624,402 B2
(45) Date of Patent: Apr. 11, 2023

(54) NON-ELLIPTICAL CONTACT PROFILE FOR ROLLER BEARING

(71) Applicant: The Timken Company, North Canton, OH (US)

(72) Inventors: Xiaolan Ai, Massillon, OH (US); Jerry P. Rhodes, Canton, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 17/334,071

(22) Filed: May 28, 2021

(65) Prior Publication Data

US 2021/0285493 A1 Sep. 16, 2021

Related U.S. Application Data

(63) Continuation of application No. 16/607,172, filed as application No. PCT/US2018/028521 on Apr. 20, 2018, now Pat. No. 11,053,978.

(Continued)

(51) Int. Cl.
*F16C 33/34* (2006.01)
*F16C 33/58* (2006.01)
*F16C 33/36* (2006.01)

(52) U.S. Cl.
CPC .............. *F16C 33/34* (2013.01); *F16C 33/36* (2013.01); *F16C 33/585* (2013.01); *F16C 2240/50* (2013.01); *F16C 2240/70* (2013.01)

(58) Field of Classification Search
CPC ........ F16C 33/34; F16C 33/36; F16C 33/366; F16C 33/58; F16C 33/585; F16C 2240/50; F16C 2240/70
See application file for complete search history.

(56) References Cited

U.S. PATENT DOCUMENTS 3,740,108 A * 6/1973 Fernlund ............... F16C 23/088
384/564
5,071,265 A * 12/1991 Bowen .................... F16C 33/34
384/494

(Continued)

FOREIGN PATENT DOCUMENTS

CN      1573145 A      2/2005
CN     101365889 A      2/2009

(Continued)

OTHER PUBLICATIONS

International Search Report and Written Opinion for Application No. PCT/US2018/028521 dated Aug. 7, 2018 (17 pages).

(Continued)

*Primary Examiner* — Alan B Waits
(74) *Attorney, Agent, or Firm* — Michael Best & Friedrich LLP (57) ABSTRACT

A roller bearing includes an inner race ring, an outer race ring, and a roller arranged between and in contact with the inner and outer rings. The bearing has a flange on the inner race ring at one axial end, and a flange on the outer race ring at an opposite axial end. At least one of the flanges, or an end of the roller, has a profile including a principal segment with a reference point C defining a contact location between the roller and the flange, the principal segment having a continuously changing radius of curvature, on both sides of reference point C, that decreases as a distance from the reference point C increases.

15 Claims, 7 Drawing Sheets

Related U.S. Application Data (60) Provisional application No. 62/519,464, filed on Jun. 14, 2017, provisional application No. 62/490,392, filed on Apr. 26, 2017.

(56) References Cited

U.S. PATENT DOCUMENTS

| | | | |
|---|---|---|---|
| 6,530,693 B1 | 3/2003 | Ljuin | |
| 6,702,471 B2 | 3/2004 | Sakoda | |
| 6,767,134 B2 | 7/2004 | Murai et al. | |
| 7,416,346 B2 * | 8/2008 | Takemura | F16C 33/585 384/450 |
| 8,469,599 B2 | 6/2013 | De Mul | |
| 9,011,018 B2 | 4/2015 | Toda | |
| 9,618,043 B2 | 4/2017 | Liang | |
| 2003/0012477 A1 * | 1/2003 | Murai | F16C 33/34 384/571 |
| 2009/0003747 A1 * | 1/2009 | De Mul | F16C 33/34 384/513 |
| 2013/0322805 A1 | 12/2013 | Liang | |
| 2015/0093063 A1 * | 4/2015 | Liang | F16C 33/585 384/564 |
| 2015/0198202 A1 | 7/2015 | Murata | |
| 2015/0300410 A1 | 10/2015 | Murato | |
| 2018/0245627 A1 | 8/2018 | Kawai | |

FOREIGN PATENT DOCUMENTS

| | | |
|---|---|---|
| EP | 2309143 A1 | 4/2011 |
| EP | 2884126 A1 | 6/2015 |
| WO | 2017033977 A1 | 3/2017 |
| WO | 2018017352 A1 | 1/2018 |

OTHER PUBLICATIONS

Fujiwara et al., "Logarithmic Profiles of Rollers in Roller Bearings and Optimization of the Profiles," NTN Technical Review, 2007, No. 75, pp. 140-148. Reprint of original paper (in Japanese) Proceedings of the Japan Society of Mechanical Engineers Part C, 2006, vol. 72, pp. 3022-3029.

Office Action issued by the European Patent Office for Application No. 18723204.6 dated Nov. 11, 2020 (7 pages).

Office Action issued by the China National Intellectual Property Administration for Application No. 201880042481.9 dated Oct. 10, 2020 (20 pages including English translation).

Extended European Search Report for Application No. 22175637.2 dated Feb. 14, 2023 (8 pages).

* cited by examiner

NON-ELLIPTICAL CONTACT PROFILE FOR ROLLER BEARING

RELATED APPLICATIONS

This application is a continuation of U.S. application Ser. No. 16/607,172 filed Oct. 22, 2019, which is a 371 national phase of PCT Application No. PCT/US2018/028521 filed Apr. 20, 2018, which claims the benefit of U.S. Provisional Patent Application No. 62/490,392 filed Apr. 26, 2017, and U.S. Provisional Patent Application No. 62/519,464 filed Jun. 14, 2017, the content of all of these applications is hereby incorporated by reference herein.

BACKGROUND

The present invention relates to bearings, and more particularly to roller bearings.

Radial cylindrical bearings are used primarily to bear a substantial amount of radial load. Modern applications however require such bearings to also bear a certain amount of axial load. In these cases, the roller end and the mating faces on the inner and outer flanges of the bearing rings have to be properly designed to produce adequate contact footprints to manage contact stress and friction. Prior art designs, such as those disclosed in U.S. Pat. No. 6,530,693 B1 and U.S. Pat. No. 6,997,616 B2, propose profiled roller ends that result in elliptical-shaped contact portions or footprints between roller ends and flange faces. The shapes of the contact ellipses are determined by the principal radii at the center of the contact, and are independent of contact load. The size of the contact ellipse increases as the contact load increases. To prevent the contact footprint from having undesired interaction (e.g., truncation) with the edges of the flange face created by the undercut and outer diameter or inner diameter surface geometry, which leads to severe edge stresses, the contact ellipses are designed with their semi-major axis lying in the circumferential direction. At light loads, however, when the periphery of the contact ellipse is far away from the edges of the flange face, the shape of the contact footprint ellipse may not be the most desirable for managing the contact stress.

SUMMARY

A first aspect of the invention provides a profile at the roller end and/or the mating flange face that produces a non-elliptical footprint at the contact between the roller end and the mating flange faces. In another aspect, the invention provides a profile on the roller end face and/or flange face that contains multiple radii of curvature. Yet another aspect of the current invention is to produce a profile that contains a multi-segmented profile portion on the roller end and/or flange face with each profile segment being tangent to at least one of the adjacent profile segments. Another aspect of the current invention is to produce a profile on the roller end face and/or the flange face that contains a segment of a logarithmic profile in the contact portion.

More specifically, in one embodiment, the invention provides a roller bearing including an inner race ring, an outer race ring, and a roller arranged between and in contact with the inner and outer rings. The bearing has a flange on the inner race ring at one axial end, and a flange on the outer race ring at an opposite axial end. The roller has a profiled roller end including at least one principal segment intermediate two additional segments. The principle segment is tangentially blended with the two additional segments, and the principle segment has a first curvature that is different from the respective curvatures of the two additional segments.

In another embodiment, the invention provides a roller bearing including an inner race ring, an outer race ring, and a roller arranged between and in contact with the inner and outer rings. The bearing has a flange on the inner race ring at one axial end, and a flange on the outer race ring at an opposite axial end. At least one of the flanges is profiled to include at least one principal segment intermediate two additional segments. The principle segment is tangentially blended with the two additional segments, and the principle segment has a first curvature that is different from the respective curvatures of the two additional segments.

In yet another embodiment, the invention provides a roller bearing including an inner race ring, an outer race ring, and a roller arranged between and in contact with the inner and outer rings. The bearing has a flange on the inner race ring at one axial end, and a flange on the outer race ring at an opposite axial end. At least one of the flanges, or an end of the roller, has a profile including a principal segment with a reference point C defining a contact location between the roller and the flange, the principal segment having a continuously changing radius of curvature that decreases as a distance from the reference point C increases. In many embodiments, the reference point C may be at the center of the principal segment, but this need not be the case.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
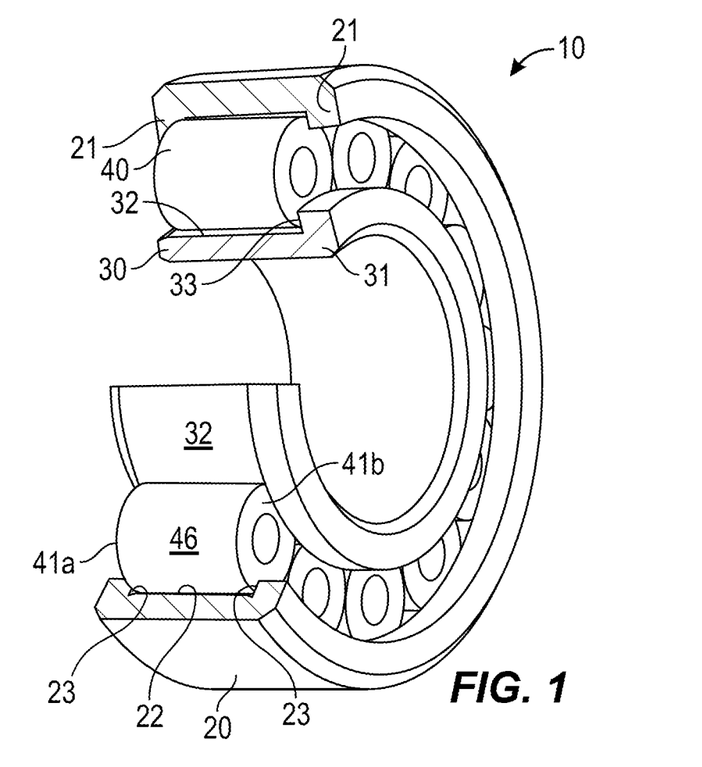
FIG. 1 is a perspective view, partially cut-away, of a rolling element bearing embodying the present invention.

Referring to FIG. 1, a roller bearing or rolling element bearing 10 of the current invention includes an outer ring 20, an inner ring 30, and a set of rollers 40 arranged between and in rolling contact with the outer and inner rings 20 and 30. While the illustrated embodiment shows a cylindrical roller bearing (with cylindrical rollers), the invention can also be applied to tapered roller bearings, spherical roller bearings, and possibly, needle roller bearings. The outer ring 20 includes at least one radially inwardly-extending flange 21 at one end of the raceway 22 defined on the outer ring 20. In the illustrated embodiment, the outer ring 20 includes two radially inwardly-extending flanges 21. Each flange 21 includes a flange face 23 facing axially inwardly toward the raceway 22.

The inner ring 30 includes at least one radially outwardly-extending flange 31 at one axial end of the raceway 32 defined on the inner ring 30. The flange 31 includes a flange face 33 facing axially inwardly toward the raceway 32.

Figure 2:
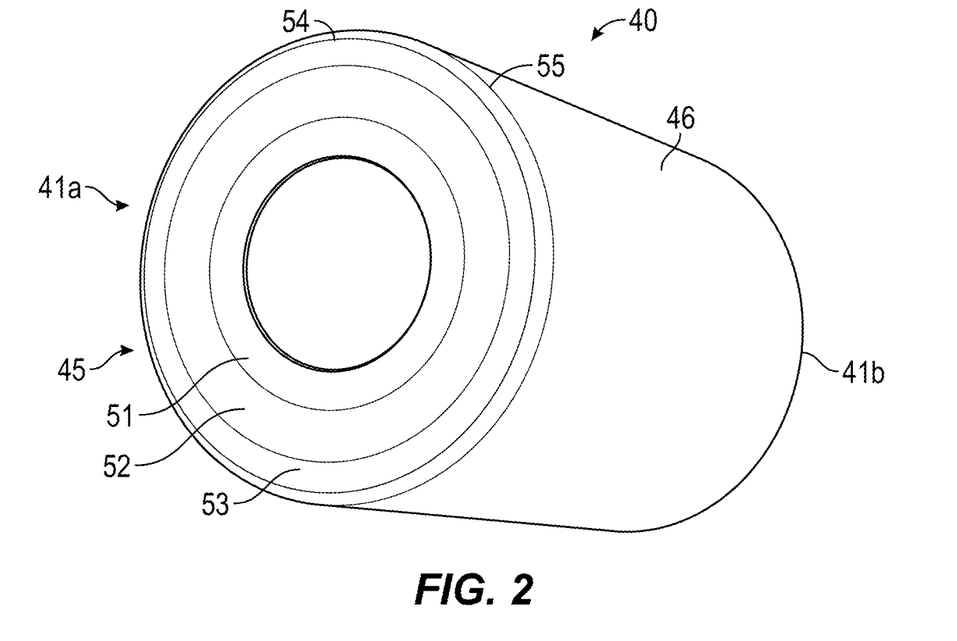
FIG. 2 is a perspective view of a rolling element of the rolling element bearing of FIG. 1.

Each roller 40 has two end faces 41a and 41b, and an outer diameter surface 46 that engages and rolls on the raceways 22, 32. The end faces 41a, 41b may be made substantially symmetrical to a center radial plane (a plane perpendicular to roller axis) of the roller 40, however this need not be the case.

Figure 3:
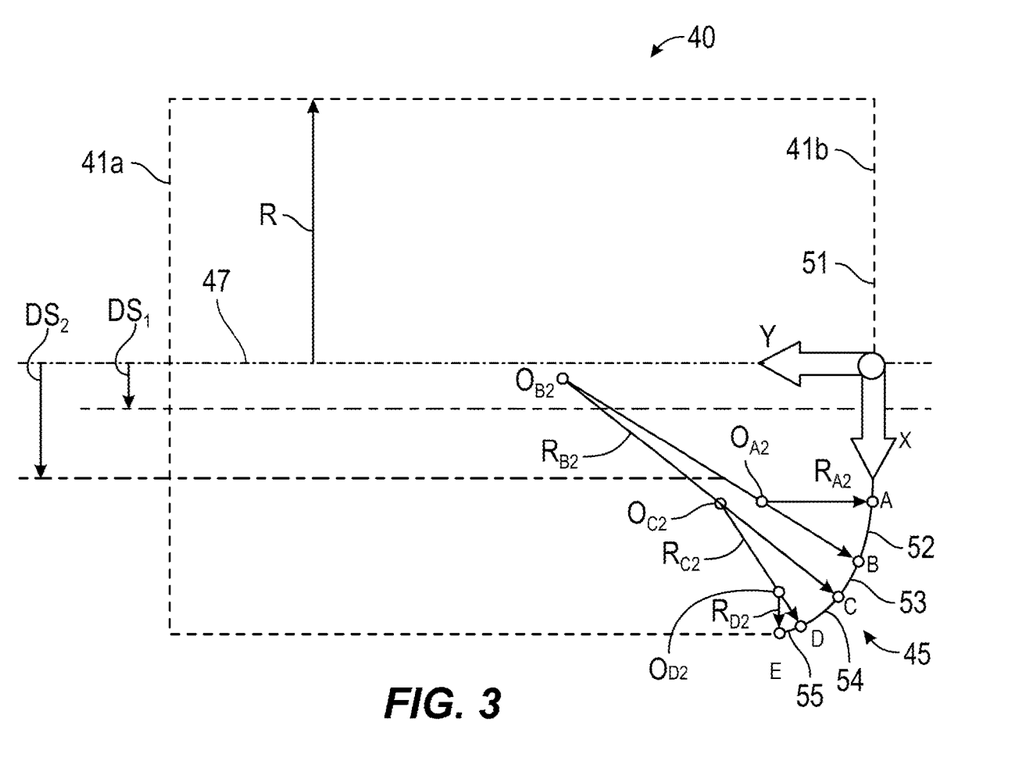
FIG. 3 is a schematic view of the rolling element of FIG. 2, illustrating a portion of the curved end face profile.

With reference to FIGS. 2 and 3, each end face 41a, 41b contains a curved profile 45 defined in an axial plane through a rotational axis 47 (see FIG. 3) of the roller 40. The curved profile 45 is formed by multiple segments 51, 52, 53, 54, and 55 as, for example, shown in FIGS. 2 and 3. It is to be understood that in FIG. 3, only the lower right corner of the roller 40 is illustrated with the profile 45 for simplicity and clarity, but that at least the upper right corner of the end face 41b would have the same profile mirrored about the axis 47. Likewise, the end face 41a could include the same profile 45 mirrored about the axial center-point of the roller 40. Each profile segment 51, 52, 53, 54 and 55 is defined by a mathematically defined curvature. The profile segment 51 is a portion of a straight line whose curvature radius is infinity. Profile segments 52 to 55 are portions of circles with curvature radii of $R_{A2}$, $R_{B2}$, $R_{C2}$, and $R_{D2}$, respectively. The centers of these curvatures are at $O_{A2}$, $O_{B2}$, $O_{C2}$, and $O_{D2}$, respectively. Profile segments 51 and 52 are blended at a tangent point A. Profile segments 52 and 53 are blended at a tangent point B. Profile segments 53 and 54 are blended at a tangent point C. Profile segments 54 and 55 are blended at a tangent point D. Profile segment 55 is blended with the outer diameter surface 46 of the roller 40 at point E. Unlike the other blending points (A-D), point E may or may not be a tangent point. The profile segment 55 is optional. In cases where the profile segment 55 is not used, profile segment 54 can be blended directly with outer diameter surface 46 at a non-tangent point.

Figure 4:
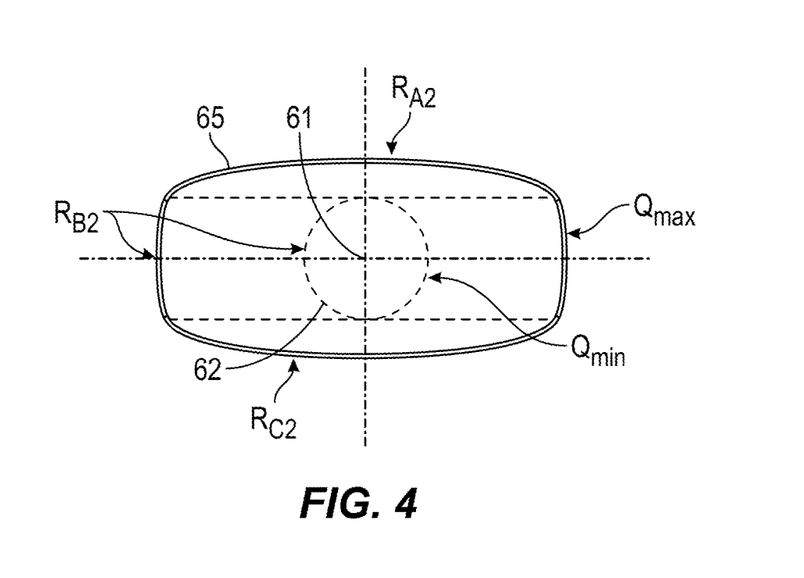
FIG. 4 schematically illustrates the contact footprint between the rolling element of FIG. 3 and the mating flange face of the rolling element bearing.
Figure 5:
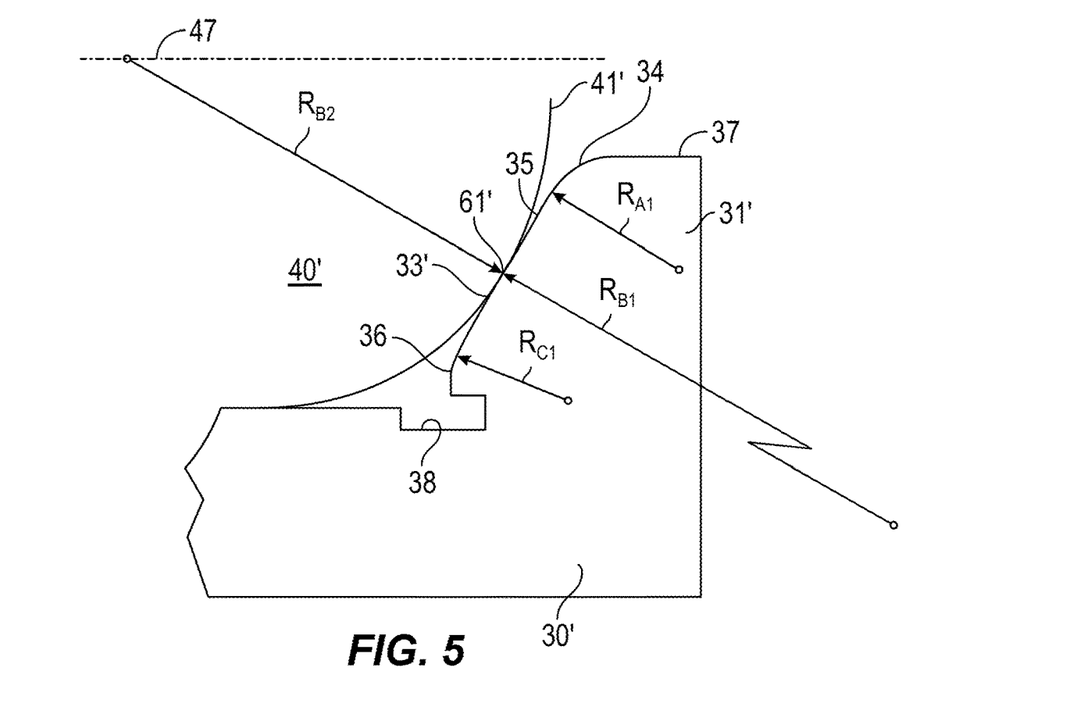
FIG. 5 schematically depicts an alternative embodiment of the invention in which the roller end profile is spherical and the mating flange face has at least three profile segments.
Figure 6:
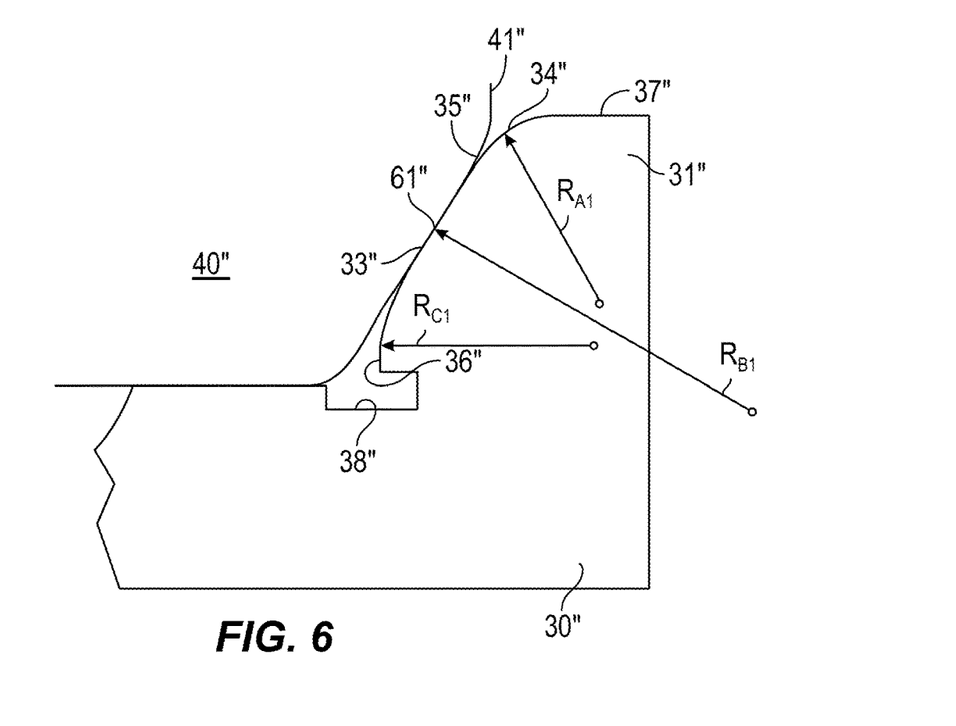
FIG. 6 schematically depicts another alternative embodiment of the invention in which the roller end profile is conical and the mating flange face has at least three profile segments.

The locations of the profile segments 51, 52, 53, 54 and 55 of the rollers 40 are designed such that when the roller 40 is assembled and set in operation in a bearing 10 under thrust load, the contact between the roller end 41a or 41b and the mating flange face 23 and/or 33 starts at point 61 (see FIGS. 4-6). Referring to FIG. 4, a contact patch or footprint 62 is developed as contact load increases. The contact footprint 62 remains elliptical or circular in shape when the contact load is relatively low before reaching a load threshold of $Q_{min}$. This ellipse or circle corresponds to profile segment 53 (BC) with the curvature radius $R_{B2}$. As the load continues to increase, the contact footprint 62 starts to deviate from its original elliptical or circular shape. Specifically, the contact footprint 62 is truncated by segment 52 (AB) at the upper side and by segment 54 (CD) at the lower side, and assumes a non-ellipse or non-elliptical shape as represented in the area between 65 and 62. As the load further increases, the aspect ratio (length over width) of the contact footprint 62 increases, and reaches a predetermined or desirable value for optimal contact attributes, such as flange torque and/or wear rate, under a predetermined design load $Q_{max}$. At load $Q_{max}$, the contact footprint is represented by 65, and is non-elliptical in shape.

To achieve the above mentioned non-elliptical shape during contact, the curvature center $O_{B2}$ of the profile segment 53 may be offset from or located at a distance from the roller axis 47 that is within (smaller than) a distance $DS_1$ (see FIG. 3). Likewise, the centers of curvatures for other profile segments may be offset from or located at distances from the roller axis 47 that is outside or above (greater than) $DS_2$ (see FIG. 3). $DS_1<0.5R$, and $DS_2>0.5R$, where R is the radius of roller body.

It should be noted that to achieve the above-mentioned non-elliptical contact footprint, profile segments 52 and 54 adjacent to the principal profile segment 53 need not be portions of circles. They can be, for example, a portion of exponential curves and/or logarithm curves. In yet other embodiments (such as discussed below with respect to FIGS. 7-13), the principle profile segment 53 could be a portion of exponential curves and/or logarithm curves.

The above-mentioned multi-radius profile or multi-segment profile on roller end faces can also, or alternatively, be made on flange faces 23 and/or 33. FIGS. 5 and 6 illustrate the flange faces 33, but can also represent the flange faces 23.

FIG. 5 depicts a portion of a roller bearing having rollers 40' with spherical roller ends 41'. The profile of the roller end 41' is described by a single radius curve ($R_{B2}$) with the center of curvature at the rotation axis 47 of the roller. The roller 40' is brought into contact with inner ring 30' of the bearing during operation. The contact occurs at the mating flange face 33' having at least three profile segments 34, 35, and 36. Each profile segment 34, 35, and 36 may be mathematically described by a radius of curvature. The radius of curvature ($R_{B1}$) for the second profile segment 35 can be infinity, that is to say the second profile segment is a straight line. The first profile segment 34 is designed to be tangent to the second profile segment 35. The second profile segment 35, in turn, is tangent to the third profile segment 36. The first profile segment 34 is blended to the outer diameter 37 of the flange 31' at a non-tangent point. The third profile segment 36 is blended to the undercut 38 of the flange at another non-tangent point. When the roller 40' is brought into contact with the mating flange 31' at the contact point 61', an elliptically-shaped or circular contact footprint initially develops. The elliptically-shaped or circular contact footprint corresponds to the curvature radius $R_{B2}$ of the roller end 41'. As the load is increased, the ellipse is truncated by profile segment 34" at the upper side and by profile segment 36" at the lower side. The aspect ratio of the truncated ellipse increases as the contact load increases.

FIG. 6 depicts a roller bearing having rollers 40" that have conical roller ends 41". The profile of the mating face 33" of the flange 31" is mathematically described by multi-radius curves. The profile has at least three segments 34", 35", and 36". Any two adjacent segments are tangent to each other. When the roller 40" is brought into contact with the mating flange 31" at the contact point 61", an elliptically-shaped or circular contact footprint initially develops. The elliptically-shaped or circular contact footprint corresponds to the curvature radius $R_{B1}$ of the profile segment 35". As the load is increased, the ellipse is truncated by profile segment 34" at the upper side and by profile segment 36" at the lower side. The aspect ratio of the truncated ellipse increases as the contact load increases. At a predetermined design load for the bearing, the contract footprint is non-elliptical.

A non-elliptical contact footprint can be obtained by composite profiles at the contact location between the roller end and the mating flange face. This is to say that multi-radius profiles or multi-segment profiles can be placed either on the roller end, on the flange face, or on both the roller end and the flange faces. The profile segment (or segments) at the center of the contact footprint has a radius of curvature that is substantially greater than that of the segments adjacent to that center segment. At a predetermined design load for the bearing, the contract footprint is non-elliptical.

Figure 7:
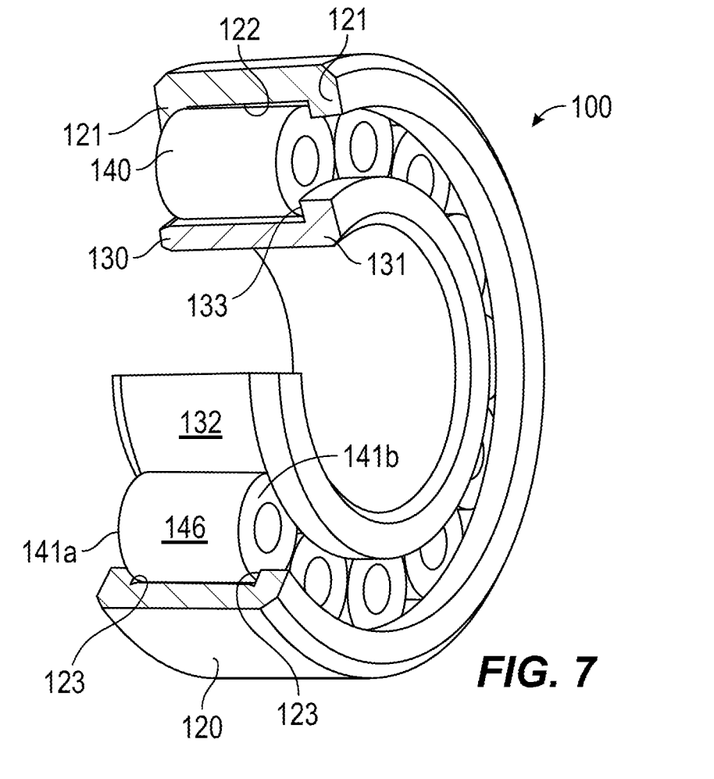
FIG. 7 is a perspective view, partially cut-away, of another rolling element bearing embodying the present invention.

FIGS. 7-11 illustrate another embodiment of a roller or rolling element bearing 100 of the current invention. Referring to FIG. 7, the bearing 100 includes an outer ring 120, an inner ring 130, a set of rollers 140 arranged between and in rolling contact with the outer and inner rings 120, and 130. While the illustrated embodiment shows a cylindrical roller bearing (with cylindrical rollers), the invention can also be applied to tapered roller bearings, spherical roller bearings, and, possibly, needle roller bearings. The outer ring 120 includes at least one radially inwardly-extending flange 121 at one end of the raceway 122 defined on the outer ring 120. In the illustrated embodiment, the outer ring 120 includes two radially inwardly-extending flanges 121. Each flange 121 includes a flange face 123 facing axially inwardly toward the raceway 122.

The inner ring 130 includes at least one radially outwardly-extending flange 131 at one axial end of the raceway 132 defined on the inner ring 130. The flange 131 includes a flange face 133 facing axially inwardly toward the raceway 132.

Figure 8:
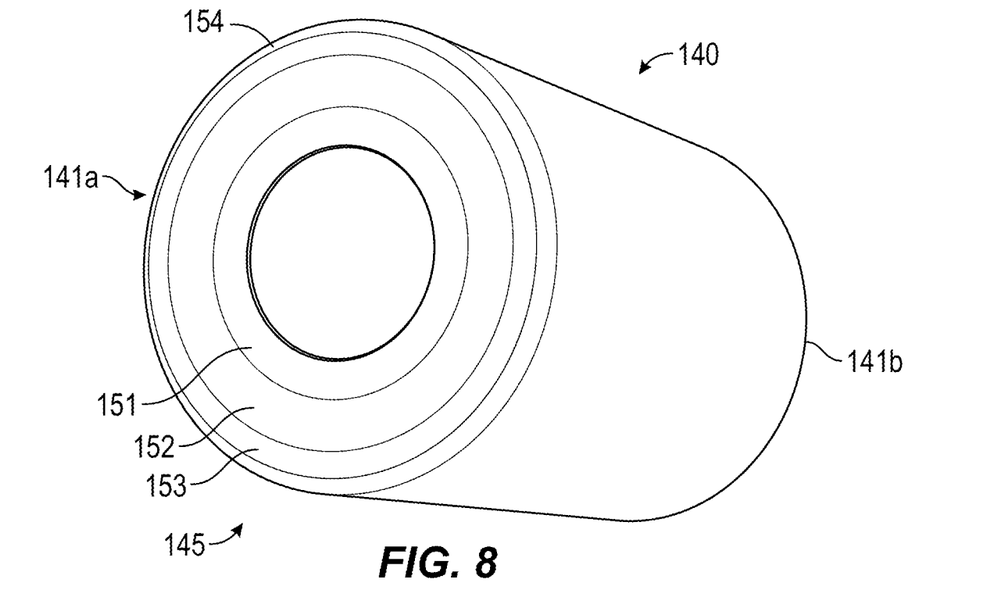
FIG. 8 is a perspective view of a rolling element of the rolling element bearing of FIG. 7.

Each roller 140 has two end faces 141a and 141b, and an outer diameter surface 146 that engages and rolls on the raceways 122, 132. The end faces 141a, 141b may be made substantially symmetrical to a center radial plane (a plane perpendicular to roller axis) of the roller 140, however this need not be the case.

Figure 9:
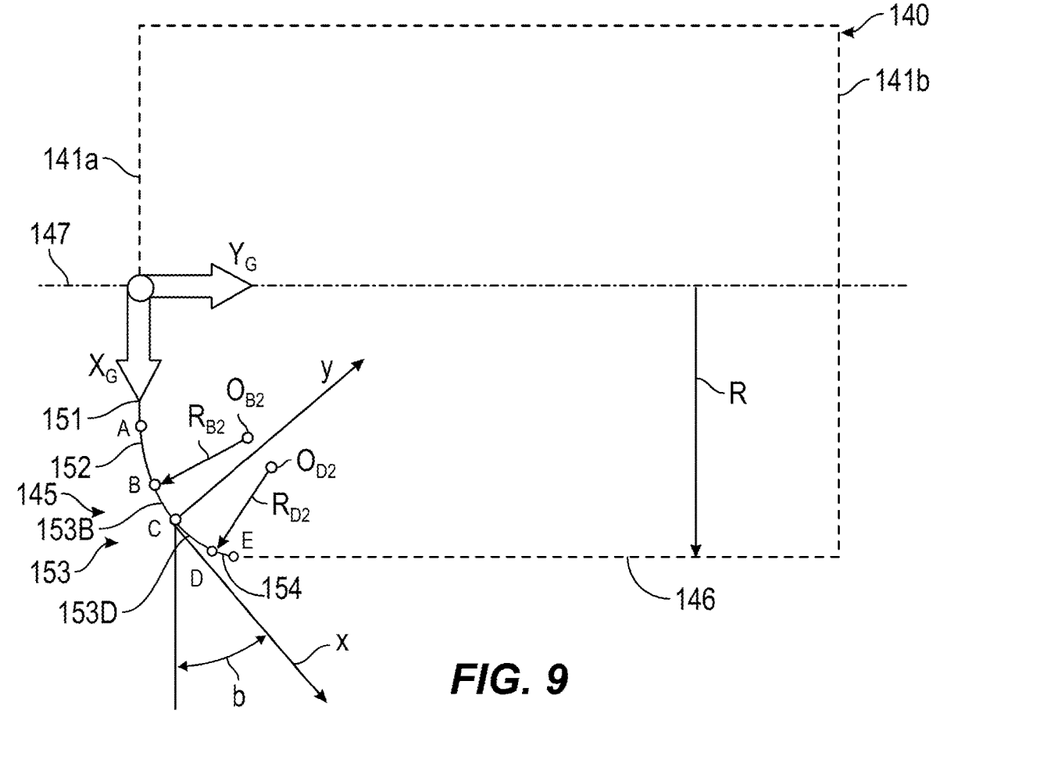
FIG. 9 is a schematic view of the rolling element of FIG. 8, illustrating a portion of the curved end face profile.

With reference to FIGS. 8 and 9, each end face 141a, 141b contains a curved profile 145 defined in an axial plane that passes through the rotational axis 147 (See FIG. 9) of the roller 140. The curved profile 145 is formed by multiple segments 151, 152, 153, and 154 as for example shown in FIGS. 8 and 9. It is to be understood that in FIG. 9, only the lower left corner of the roller 140 is illustrated with the profile 145 for simplicity and clarity, but that at least the upper left corner of the end face 141a would have the same profile 145 mirrored about the axis 147. Each profile segment 151, 152, 153, and 154 is defined by a mathematically described or defined curvature. Each segment 151, 152, 153, and 154 can be a straight line, a portion of a circle, or a complex curve described for example by logarithmic or exponential equations.

The profile segment 151 is a portion of a straight line whose curvature radius is infinity. Profile segments 152 and 154 are portions of circles with curvature radii of $R_{B2}$ and $R_{D2}$, respectively. The centers of these curvatures are at $O_{B2}$ and $O_{D2}$ respectively. Profile segments 151 and 152 are blended at tangent point A. Profile segments 152 and 153 are blended at a tangent point B. Profile segments 153 and 154 are blended at a tangent point D. Profile segment 153 extends from point B to point D and includes point C. As such, profile segment 153 can be broken into segment portions 153B and 153D. Profile segment 154 is blended with the body 146 or outer diameter of the roller 140 or a green corner of the roller at point E. Unlike blending points (A-D), point E may or may not be a tangent point.

Figure 10:
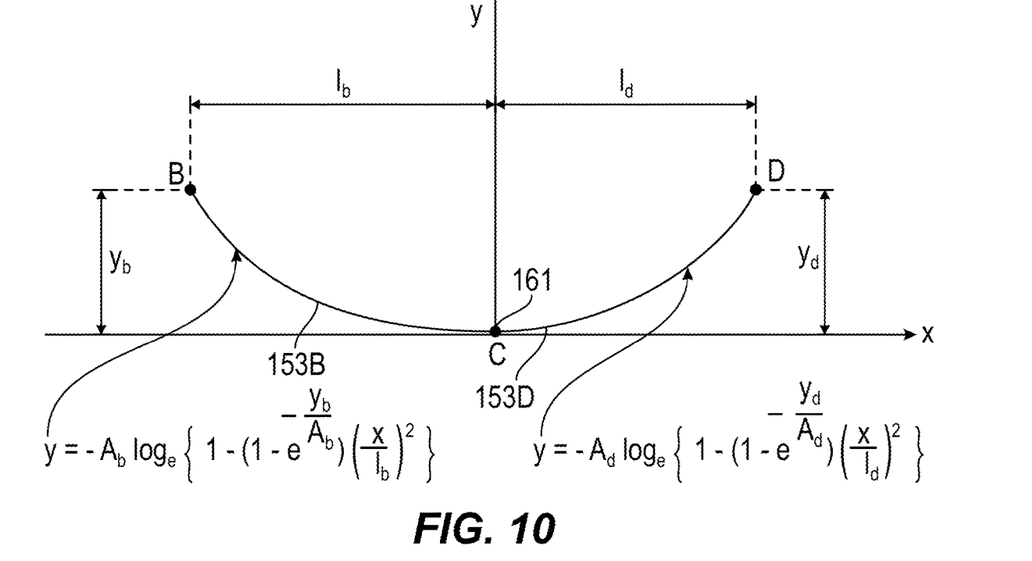
FIG. 10 is an enlarged partial view of the schematic view of FIG. 9.

Profile segment 153 is a logarithmic curve or logarithmic curves described by the following equations in local x-y coordinate system whose origin is at the central contact point indicated by the reference point C or 161, with the x-axis being tangent to the roller end profile at the contact point C. The angle b represents the contact angle, which is also the rotation angle between the local x-y and global $X_G$-$Y_G$ coordinate systems.

$$y = -A_b \log_e \left\{ 1 - \left(1 - e^{-\frac{y_b}{A_b}}\right)\left(\frac{x}{l_b}\right)^2 \right\} \quad x \leq 0 \tag{1a}$$

$$y = -A_d \log_e \left\{ 1 - \left(1 - e^{-\frac{y_d}{A_d}}\right)\left(\frac{x}{l_d}\right)^2 \right\} \quad x \geq 0 \tag{1b}$$

where $A_b$ and $A_d$ are constants related to deflection of the contact surfaces in y-direction under nominal design load (e.g., in some embodiments may vary from 1-100 microns, or more preferably from 10-25 microns); $l_b$, $l_a$, $y_b$ and $y_d$ are the distances as defined in FIG. 10. More specifically, $l_b$ is a distance in the local x-direction between point C and point B, $l_d$ is a distance in the local x-direction between point C and point D, $y_b$ is a distance in the local y-direction between point C and point B, and $y_d$ is a distance in the local y-direction between point C and point D.

The logarithmic curves of segment portion 153B (CB) and 153D (CD) are described by equations (1a) and (1b), respectively, and have continuously variable curvature radii. For example, at the starting point C, the curvature radii for CB and CD are, respectively, $$R_{C-} = \frac{l_b^2}{2 A_b \left(1 - e^{-\frac{y_b}{A_b}}\right)} \tag{2a}$$

$$R_{C+} = \frac{l_d^2}{2 A_d \left(1 - e^{-\frac{y_d}{A_d}}\right)} \tag{2b}$$

At the end ending points (B or D) of the logarithmic curves (CB and CD), the curvature radii are, respectively, $$R_B = \frac{l_b}{2} \cdot \frac{\left[ 4\left(\frac{A_b}{l_b}\right)^2 \left(e^{\frac{y_b}{A_b}} - 1\right)^2 + 1 \right]^{3/2}}{\left(\frac{A_b}{l_b}\right)\left(e^{\frac{y_b}{A_b}} - 1\right)\left(2 e^{\frac{y_b}{A_b}} - 1\right)} \tag{3a}$$

-continued $$R_D = \frac{l_d}{2} \cdot \frac{\left[4\left(\frac{A_d}{l_d}\right)^2\left(e^{\frac{y_d}{A_d}} - 1\right)^2 + 1\right]^{3/2}}{\left(\frac{A_d}{l_d}\right)\left(e^{\frac{y_d}{A_d}} - 1\right)\left(2e^{\frac{y_d}{A_d}} - 1\right)} \quad (3b)$$

In general, the following inequalities hold true, $$R_{C-} \geq R_B \quad (4a)$$

$$R_{C+} \geq R_D \quad (4b)$$

At the center of the contact point C, the curvature radii of the logarithmic curves are the largest. Therefore, the curvature radius at a given point decreases as the point moves along the curve away from the center of the contact point C.

It may be desirable to select design parameters such that the following equations hold true, $$R_{C-} = R_{C+} \quad (5a)$$

$$R_{B2} = R_B \quad (5b)$$

$$R_{D2} = R_D \quad (5c)$$

where $R_{B2}$ and $R_{D2}$ are curvature radii of circular segments AB and DE, respectively.

Figure 11:
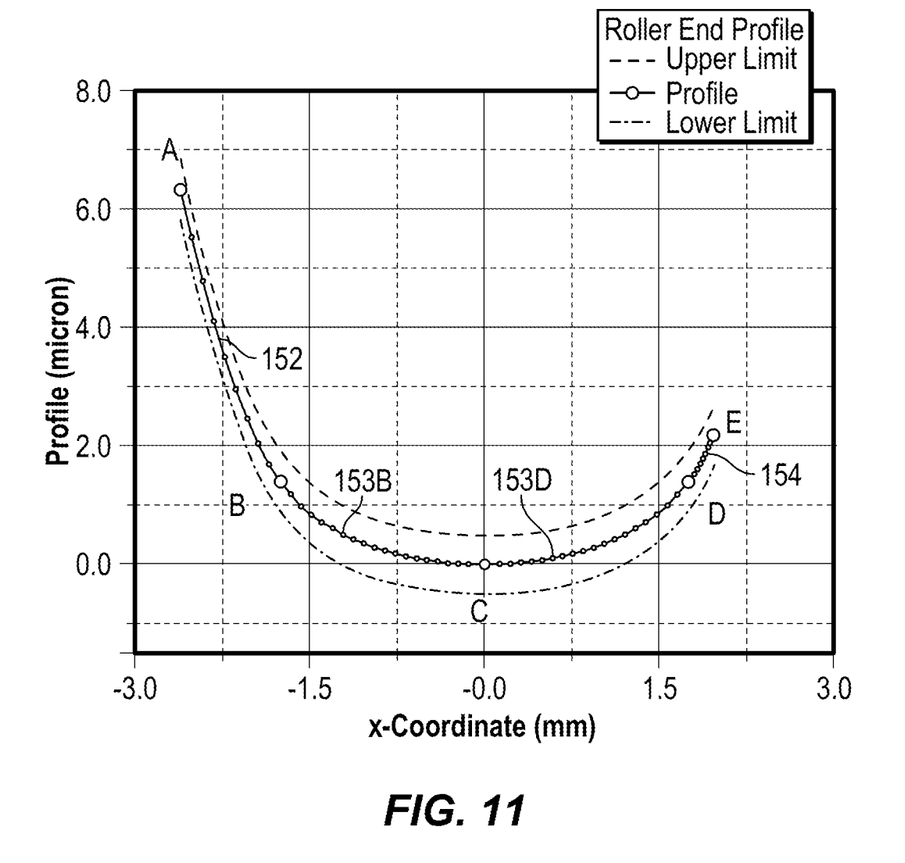
FIG. 11 is a graphical view showing the curvature of a portion of the curved end face profile of FIG. 9.

FIG. 11 shows a graphical example of a multi-segment roller end profile according to the current invention. In this example, the relationships set forth in equations (5a)-(5c) were incorporated.

Figure 12:
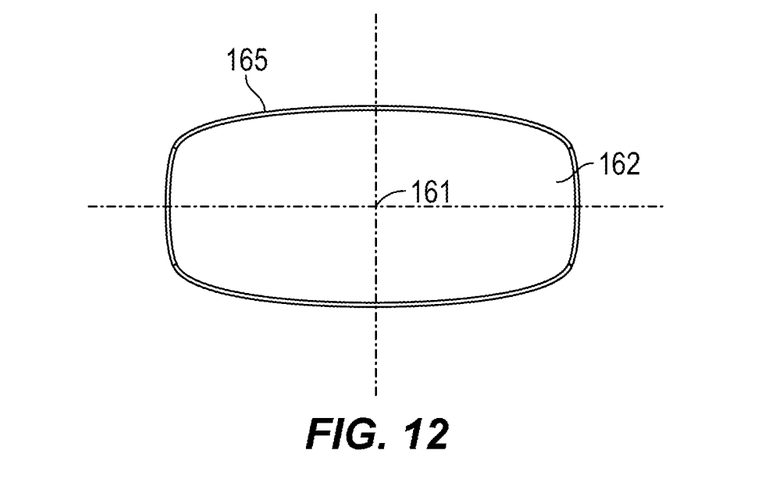
FIG. 12 schematically illustrates the contact footprint between the rolling element of FIG. 9 and the mating flange face of the rolling element bearing.

With reference to FIG. 12, the locations of the profile segments 151, 152, 153, and 154 of the rollers 140 are designed such that when the roller 140 is assembled and set in operation in a bearing 100 under thrust load, the contact between roller end 141a or 141b and the mating flange face 123 and/or 133 starts at point 161. A footprint 162 is developed as contact load increases. The size and shape of the footprint 162 change as contact load increases. At a predetermined design load for the bearing 100, the contract footprint is non-elliptical.

Profile segments 152 and 154 adjacent to the principal profile segment 153 need not be portions of circles. They can be, for example, be portions of exponential curves or portions of logarithmic curves. In yet other alternatives, the profile segments 152, 154 might be extensions of the logarithmic curves used for the principle profile segment 153. In yet other embodiments, there need not be additional, adjacent profile segments 152 and 154. Instead, the principle segment 153 can be the sole segment of the curved profile 145.

Figure 13:
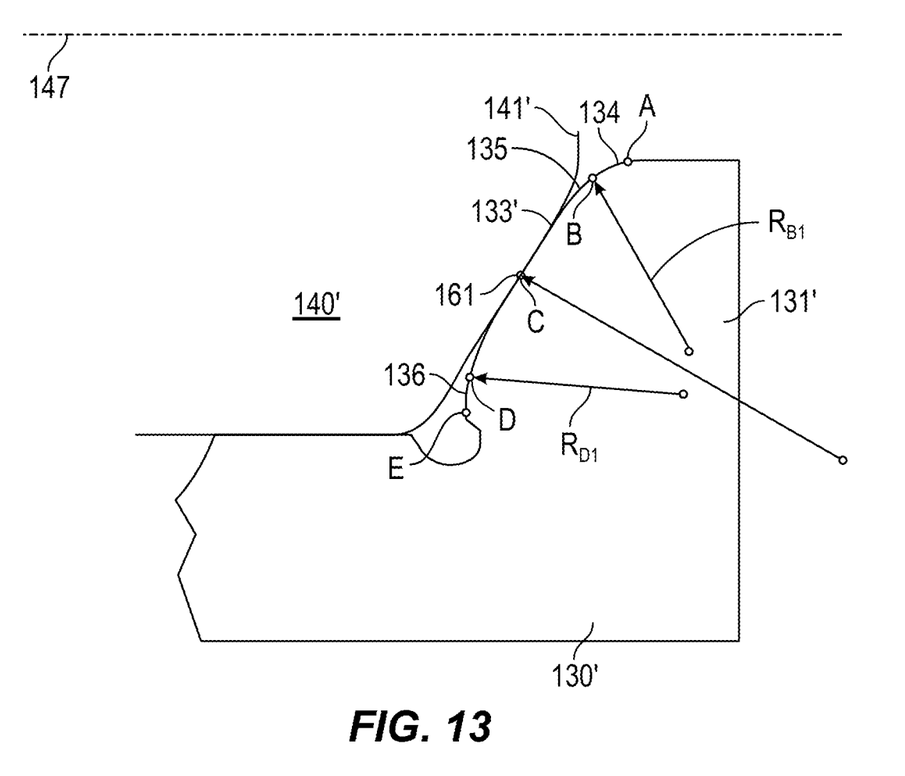
FIG. 13 schematically depicts another alternative embodiment of the invention in which the roller end profile is conical and the mating flange face has at least three profile segments, with at least one segment being a portion of a logarithmic curve.

The above-mentioned multi-segment roller end profiles can also, or alternatively, be made on flange faces 123 and/or 133. FIG. 13 illustrates the flange face 133, but can also represent the flange faces 123.

FIG. 13 depicts a roller bearing with rollers 140' having conical roller ends 141'. The profile of the mating face 133' of the flange 131' is mathematically described by multi-segment curves. The profile has at least three segments 134, 135 and 136. Any two adjacent segments are tangent to each other. When the roller 140' is brought into contact with the mating flange 131' at the contact point 161, a non-elliptical contact footprint develops at a predetermined design load. The non-elliptical contact footprint corresponds to the logarithmic curves of the profile segment 135, which can have same curvature as the profile segment 153 described above. The aspect ratio of the contact footprint increases as the contact load further increases.

Once again, a non-elliptical contact footprint can be obtained by composite profiles at the contact location between the roller end and the mating flange face. This is to say that multi-segment profiles can be placed either on the roller end, on the flange face, or on both the roller end and the flange faces. The profile segment or segments at the center of the contact footprint is a portion of a logarithmic curve that has continuously changing curvature radii. The curvature radii of the logarithmic segment are no less than that of the segments adjacent to the logarithmic segment.

Various features and advantages of the invention are set forth in the following claims.

What is claimed is:

1. A roller bearing comprising:
   an inner race ring;
   an outer race ring; and
   a roller arranged between and in contact with the inner and outer rings;
   wherein the bearing has a flange on the inner race ring at one axial end, and a flange on the outer race ring at an opposite axial end;
   wherein at least one of the flanges, or an end of the roller, has a profile including a principal segment with a reference point C defining a contact location between the roller and the flange, the principal segment having a continuously changing radius of curvature, on both sides of reference point C, that decreases as a distance from the reference point C increases.

2. The roller bearing of claim 1, wherein the principal segment is intermediate two additional segments, the two additional segments each being portions of a circle.

3. The roller bearing of claim 2, wherein respective radii of curvatures of the two additional segments are different.

4. The roller bearing of claim 2, further comprising a fourth segment tangentially blended with one of the two additional segments.

5. The roller bearing of claim 2, wherein a radius of curvature at the reference point C of the principal segment is greater than a radius of curvature of each of the two additional segments.

6. The roller bearing of claim 1, wherein the principal segment is a portion of one or more logarithmic curves.

7. The roller bearing of claim 1, wherein the principal segment is described by the following equations:

$$y = -A_b \log_e\left\{1 - \left(1 - e^{-\frac{y_d}{A_b}}\right)\left(\frac{x}{l_b}\right)^2\right\} \quad x \leq 0$$

$$y = -A_d \log_e\left\{1 - \left(1 - e^{-\frac{y_d}{A_d}}\right)\left(\frac{x}{l_d}\right)^2\right\} \quad x \geq 0$$

wherein a local x-y coordinate system has an origin at the reference point C with the x-axis being tangent to the reference point C;
wherein the principal segment has endpoints B and D;
wherein $l_b$ is a distance in a local x-direction between point C and point B, $l_d$ is a distance in the local x-direction between point C and point D, $y_b$ is a distance in a local y-direction between point C and point B, and $y_d$ is a distance in the local y-direction between point C and point D; and
wherein $A_b$ and $A_d$ are constants related to deflection of the contact surfaces under nominal design load.

8. The roller bearing of claim 1, wherein the principal segment is intermediate two additional segments, and wherein the principle segment and two additional segments are formed on the end of the roller.

9. The roller bearing of claim 1, wherein the principal segment is intermediate two additional segments, and wherein the principle segment and two additional segments are formed on the flange face.

10. The roller bearing of claim 1, wherein the principal segment is formed on the end of the roller.

11. The roller bearing of claim 10, wherein the principal segment is at a first axial end of the roller, and wherein the roller includes a second principal segment at a second axial end of the roller.

12. The roller bearing of claim 1, wherein the principal segment is formed on the flange face.

13. The roller bearing of claim 12, wherein the roller includes a roller end that engages the principal segment, the roller end being conical.

14. The roller bearing of claim 1, wherein a contact footprint defined between the flange and the end of the roller is non-elliptical in shape when the bearing operates at a predetermined design load.

15. A roller bearing comprising:
an inner race ring;
an outer race ring; and
a roller arranged between and in contact with the inner and outer rings;
wherein the bearing has a flange on the inner race ring at one axial end, and a flange on the outer race ring at an opposite axial end;
wherein at least one of the flanges, or an end of the roller, has a profile including a principal segment with a reference point C defining a contact location between the roller and the flange, the principal segment having a continuously changing radius of curvature, on both sides of reference point C, that decreases as a distance from the reference point C increases;
wherein the principal segment is intermediate two additional segments, the two additional segments each being portions of a circle; and
wherein the principal segment is described by the following equations:

$$y = -A_b \log_e \left\{ 1 - \left(1 - e^{-\frac{y_d}{A_b}}\right)\left(\frac{x}{l_b}\right)^2 \right\} \quad x \leq 0$$

$$y = -A_d \log_e \left\{ 1 - \left(1 - e^{-\frac{y_d}{A_d}}\right)\left(\frac{x}{l_d}\right)^2 \right\} \quad x \geq 0$$

wherein a local x-y coordinate system has an origin at the reference point C with the x-axis being tangent to the reference point C;
wherein the principal segment has endpoints B and D;
wherein $l_b$ is a distance in a local x-direction between point C and point B, $l_d$ is a distance in the local x-direction between point C and point D, $y_b$ is a distance in a local y-direction between point C and point B, and $y_d$ is a distance in the local y-direction between point C and point D; and
wherein $A_b$ and $A_d$ are constants related to deflection of the contact surfaces under nominal design load.

* * * * *

UNITED STATES PATENT AND TRADEMARK OFFICE
CERTIFICATE OF CORRECTION

PATENT NO. : 11,624,402 B2
APPLICATION NO. : 17/334071
DATED : April 11, 2023
INVENTOR(S) : Xiaolan Ai and Jerry P. Rhodes Page 1 of 1

It is certified that error appears in the above-identified patent and that said Letters Patent is hereby corrected as shown below:

In the Claims

Claim 7, Line 49: please replace:

"$y = -A_b \log_e \left\{ 1 - \left(1 - e^{-\frac{y_d}{A_b}}\right)\left(\frac{x}{l_b}\right)^2 \right\} \quad x \leq 0$"

With:

"$y = -A_b \log_e \left\{ 1 - \left(1 - e^{-\frac{y_b}{A_b}}\right)\left(\frac{x}{l_b}\right)^2 \right\} \quad x \leq 0$"

Claim 15, Line 13: please replace:

"$y = -A_b \log_e \left\{ 1 - \left(1 - e^{-\frac{y_d}{A_b}}\right)\left(\frac{x}{l_b}\right)^2 \right\} \quad x \leq 0$"

With:

"$y = -A_b \log_e \left\{ 1 - \left(1 - e^{-\frac{y_b}{A_b}}\right)\left(\frac{x}{l_b}\right)^2 \right\} \quad x \leq 0$"

Signed and Sealed this
Thirtieth Day of April, 2024

Katherine Kelly Vidal
*Director of the United States Patent and Trademark Office*